(12) United States Patent
Le Collen et al.

(10) Patent No.: US 12,070,782 B2
(45) Date of Patent: Aug. 27, 2024

(54) METHOD FOR PRODUCING A HOLLOW PART MADE OF A METAL MATERIAL AND USE OF THIS METHOD FOR PRODUCING A LANDING GEAR ROD OR BEAM

(71) Applicant: AUBERT & DUVAL, Paris (FR)

(72) Inventors: Yvon Le Collen, Montvicq (FR); Laurent Foucher, Pamiers (FR)

(73) Assignee: AUBERT & DUVAL, Paris (FR)

( * ) Notice: Subject to any disclaimer, the term of this patent is extended or adjusted under 35 U.S.C. 154(b) by 190 days.

(21) Appl. No.: 16/963,305

(22) PCT Filed: Jan. 18, 2019

(86) PCT No.: PCT/EP2019/051211
§ 371 (c)(1),
(2) Date: Jul. 20, 2020

(87) PCT Pub. No.: WO2019/141798
PCT Pub. Date: Jul. 25, 2019

(65) Prior Publication Data
US 2021/0370372 A1    Dec. 2, 2021

(30) Foreign Application Priority Data
Jan. 22, 2018   (FR) ...................................... 18 50463

(51) Int. Cl.
*B21C 23/08*       (2006.01)
*B21C 33/00*       (2006.01)
(52) U.S. Cl.
CPC ............ *B21C 23/08* (2013.01); *B21C 33/004* (2013.01)
(58) Field of Classification Search
CPC ..... B21C 23/08; B21C 23/004; B21C 33/004; B21J 5/10; B21K 1/063; B21K 1/26
(Continued)

(56) References Cited

U.S. PATENT DOCUMENTS 1,966,602 A        7/1934   Wahlsteen
3,014,269 A    *  12/1961   Horne .................... B21C 23/16
                                                      29/889.721
(Continued)

FOREIGN PATENT DOCUMENTS

CH              332916 A        9/1958
CH              334031 A       11/1958
(Continued)

OTHER PUBLICATIONS

Tooling U-SME "Extrusion Processes" Youtube.com "https://www.youtube.com/watch?v=Y75IQksBb0M". (Year: 2014).*
CN 104668911A, Zhao et al. Jun. 2015.*
KR 20170110554A, Park Oct. 2017.*
Search Report for PCT/EP2019/051211.

*Primary Examiner* — Edward T Tolan
(74) *Attorney, Agent, or Firm* — Davidson Kappel LLC

(57) ABSTRACT

A method for producing a hollow part made of a metal material, includes preparing a blank of the metal material, and at least a sacrificial mandrel made of a material which has a yield stress in the range from −30% to +20% of the yield stress of the material of the blank; applying a punch on at least one of the ends of the blank in order to produce the expansion of at least a portion of said blank and to create at least one internal space inside said blank; inserting a sacrificial mandrel in said an internal space of the blank; crimping the sacrificial mandrel in said blank; producing, by co-forging, a simultaneous deformation of said blank and of said sacrificial mandrel, with a homothetic ratio K; and performing a machining in order to remove the sacrificial mandrel.

19 Claims, 18 Drawing Sheets

(58) Field of Classification Search
USPC .......................................................... 72/264
See application file for complete search history.

(56) References Cited

U.S. PATENT DOCUMENTS

| | | |
|---|---|---|
| 2002/0113094 A1 | 8/2002 | Kawahara |
| 2005/0002786 A1* | 1/2005 | Franchet .................. F01D 5/18 |
| | | 416/97 R |
| 2009/0044883 A1 | 2/2009 | Prasser et al. |
| 2014/0053623 A1 | 2/2014 | Hebrard |
| 2014/0352146 A1* | 12/2014 | Leblanc .................. B21K 3/00 |
| | | 29/888 |

FOREIGN PATENT DOCUMENTS

| | | | |
|---|---|---|---|
| EP | 1481754 A1 | 12/2004 | |
| EP | 1814679 B1 | 8/2007 | |
| EP | 2253354 A1 * | 11/2010 | ............. A62C 35/68 |
| EP | 2786814 A1 | 10/2014 | |
| FR | 2032752 A5 | 11/1970 | |
| FR | 2360361 | 3/1978 | |
| JP | 2009125802 A | 6/2009 | |
| WO | WO2011160109 A1 | 12/2011 | |
| WO | WO-2012143668 A1 * | 10/2012 | ........... B21C 33/004 |
| WO | WO2012152687 A1 | 11/2012 | |
| WO | WO2013093285 A1 | 6/2013 | |

* cited by examiner

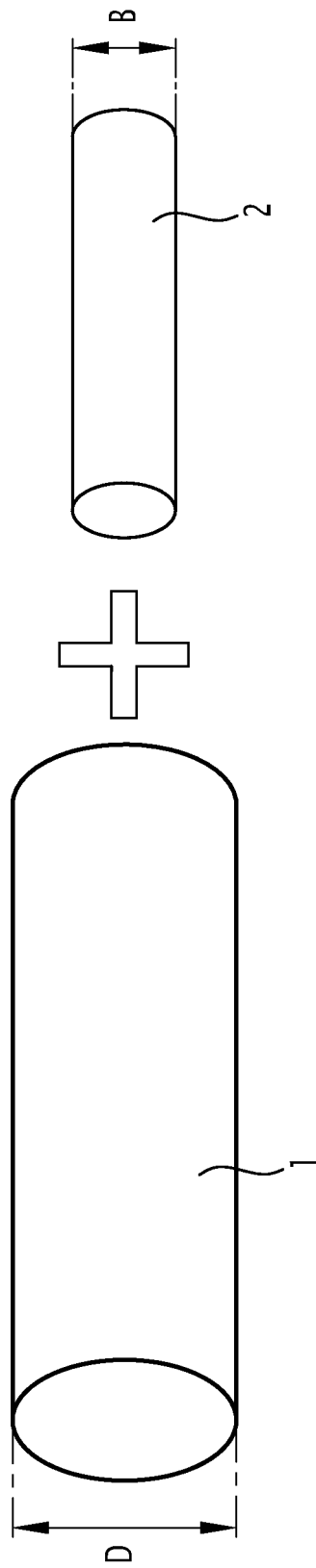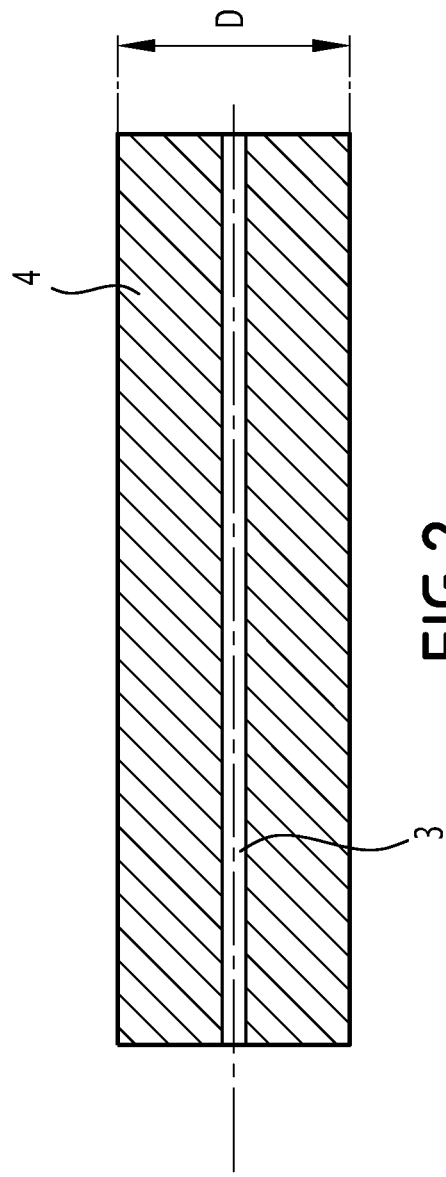

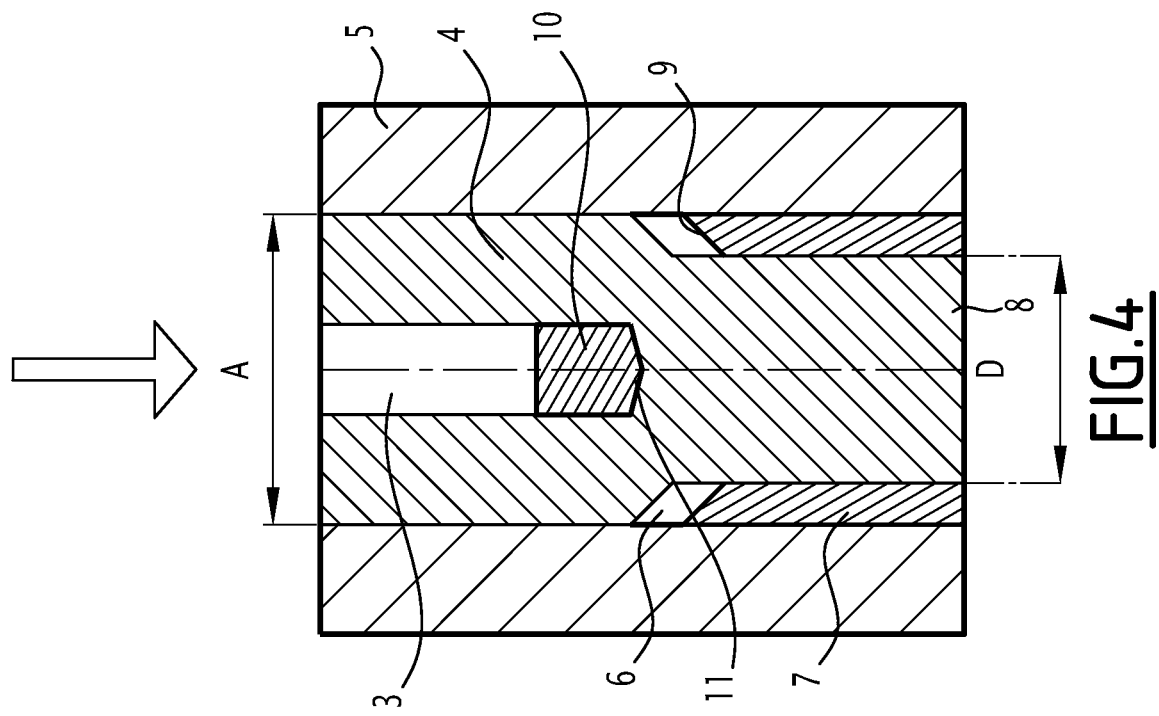
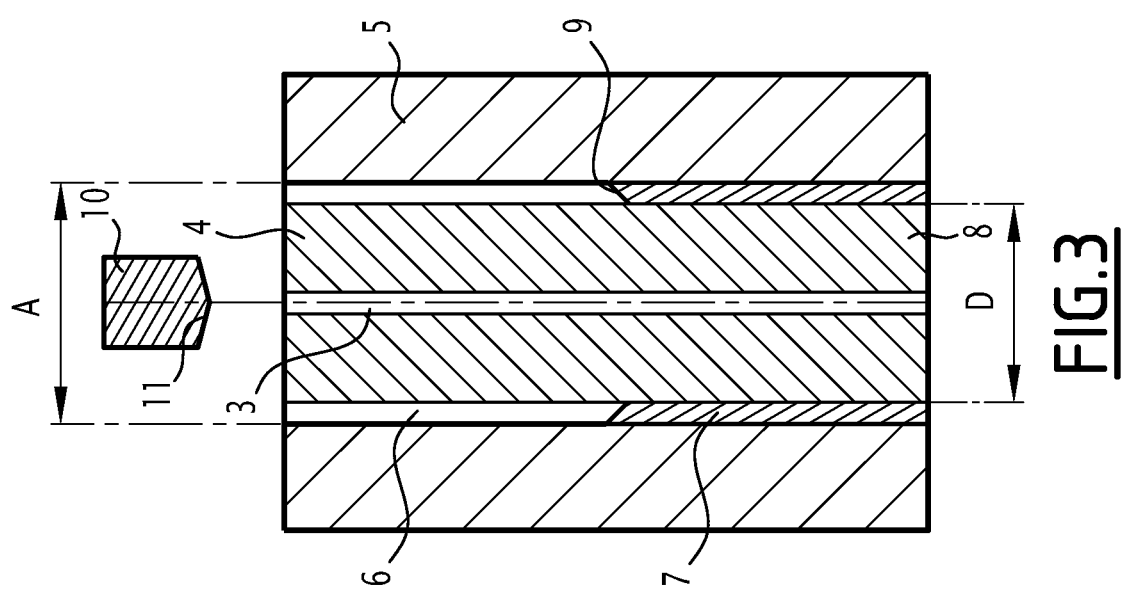

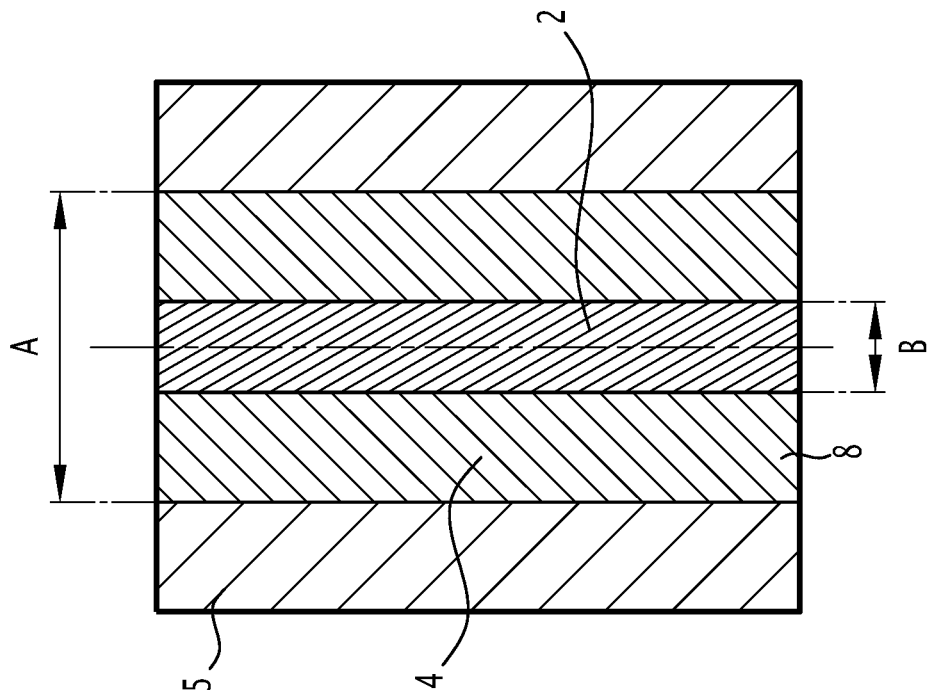
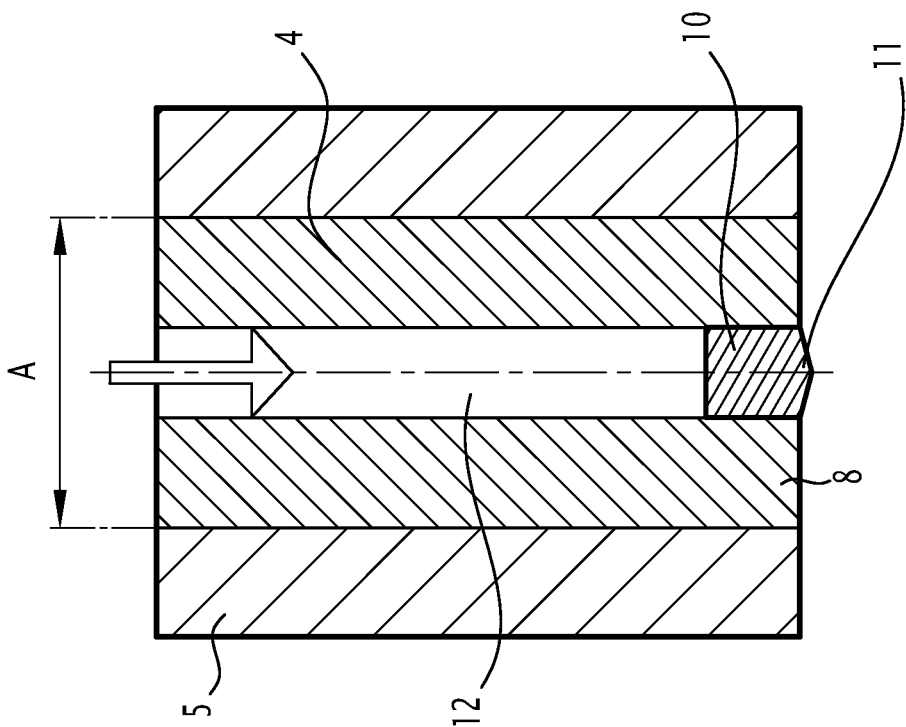

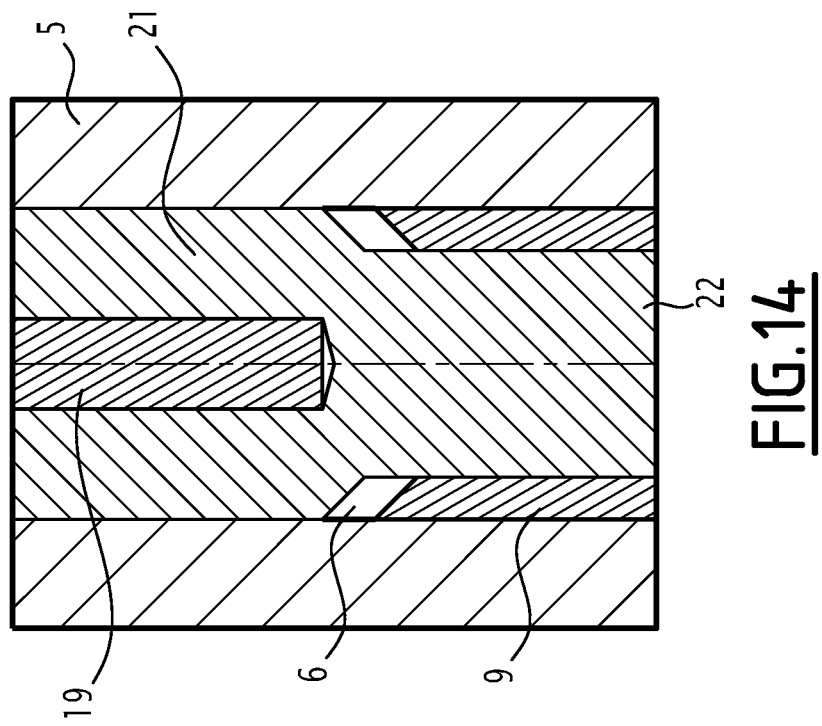

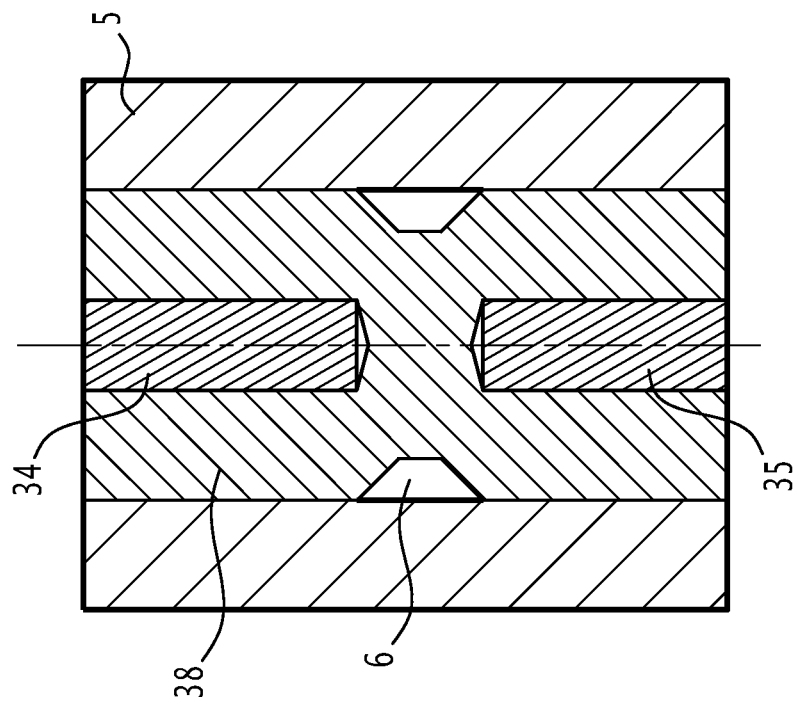
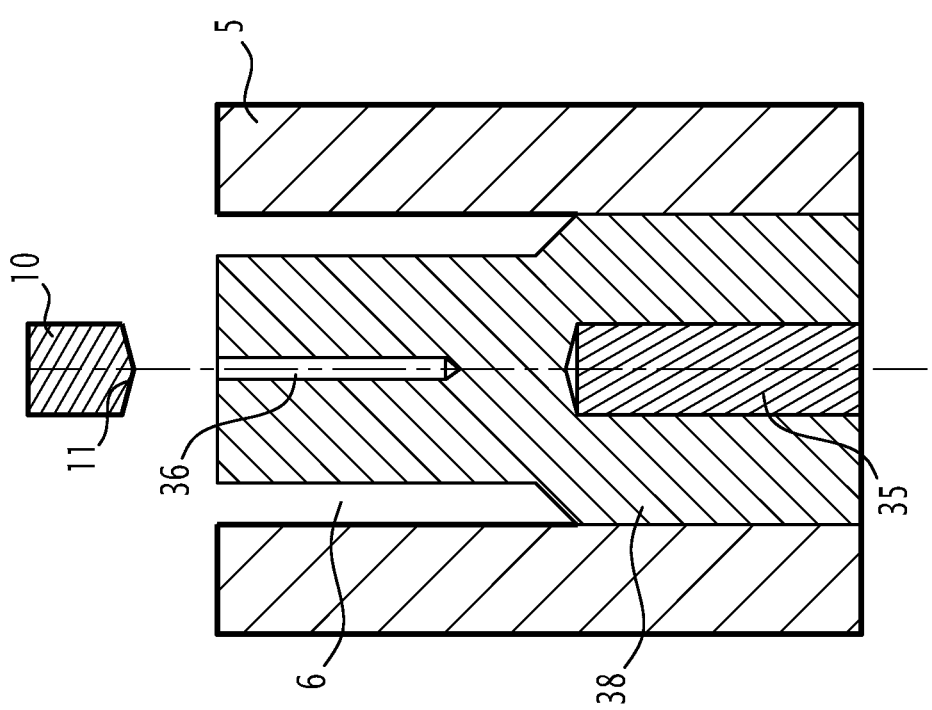

METHOD FOR PRODUCING A HOLLOW PART MADE OF A METAL MATERIAL AND USE OF THIS METHOD FOR PRODUCING A LANDING GEAR ROD OR BEAM

The present invention relates to metallurgy, and more specifically methods for transforming ingots of metal materials with a high material value, in particular alloys of Ti or nickel-based superalloys, in order to obtain hollow parts.

Within the meaning of the present disclosure, "metal material" must be understood as referring to any type of metal material irrespective of its composition, whether it is a metal meant to be pure, which will only happen in very specific cases, or more generally a metal alloy containing significant amounts of at least one element in addition to its majority base metal.

BACKGROUND

The obtainment, by shaping of ingots, of hollow parts made from metal alloy such as seamless pipes or airplane landing gear parts, can be done using various known methods.

Most conventionally and most simply, it is possible to start from an ingot of said alloy, and to shape it by forging and die stamping. Then, the hollow portion of the part is created by machining. The excess material is therefore discharged in the form of chippings. This approach is expensive, in that it requires preparing an ingot for which a large portion of the material is intended not to be found in the final part and to be discarded. Granted, the chippings can be recycled as raw material of the alloy in the melting furnace, but this does not offset the costs that were needlessly incurred to produce an ingot whose mass must be significantly greater than that of the final product. And it may be also necessary to account for the wear of the machining tools, which represents a significant portion of the manufacturing cost. This method is therefore not ideal for producing large parts made from an alloy with a high material cost, such as the Ti alloys used in aeronautics.

Another conventional approach is to shape the original ingot by hot expansion using a punch, as for example described in document FR-A-2,360,361, where this method is optimized by using a conical punch and a lubricant. This method typically applies to the case of manufacturing seamless pipes, and in general, products made by extrusion, with a circular and constant section. One variant of this is the method described in FR-A-2,032,752, in which seamless pipes are produced from hollow parts made by continuous casting, which are next forged-rolled around a mandrel. In EP-B1-1,814,679, a seamless pipe is manufactured hot from an ingot that is pierced to transform it into a hollow ingot, which is, then, stretched by radial forging around a non-deformable mandrel inserted into the hollow ingot.

Here again, however, only extruded products of constant section can be manufactured using this method.

In EP-A-2,786,814, forging of a hollow blank that has been pierced hot over its entire length and in which a non-deformable mandrel has been inserted, is combined with shaping by push bench. However, this method is only applicable to producing hollow parts that have a closed side.

In general, the punches or mandrels used in some of the methods that have been described are not meant to be deformed during the production of the product and are reusable. However, they can only lead to the development of hollow parts of constant section.

In CH-A-332,916, the production is proposed of a part such as a turbine or compressor blade, having at least one inner cavity for cooling thereof. This production is done by successively forging a blank of the finished part, producing one or several piercings with well-defined diameters and positions, filling these piercings with a material that can subsequently be removed, in particular by dissolving in an acid. Conventionally, a foundry sand can make up one such filler material. The blade is next die stamped, which also causes a deformation of the piercings, which are initially cylindrical. The piercings are next rid of their filler material and the outer profile of the blade is machined. The final blade therefore has one or several channels of form(s) that may be non-cylindrical after die stamping. The filler material of the channels having been destroyed after the die stamping, it is not reusable. Its removal is, however, complicated by the fact that the piercings have been deformed during the die-stamping, and that although initially the channels had a cylindrical shape, this will generally no longer be the case after the die-stamping. The removal of the filler material will therefore generally have to be done through a method other than machining, hence the favored use of foundry sand and acid. However, using acid poses obvious safety and residue recycling problems, and can also have unwanted effects on the surface of the part inside the channels, or even also on the outside of the part if acid comes into contact with the latter. Furthermore, the very precise control of the dimensions of the orifices of the final part is not guaranteed, since it is not possible to adjust them by machining after the removal of the filler material, and since the filler material typically cannot have very well-defined mechanical properties that would make it possible to guarantee the reproducibility of its behavior during the die-stamping.

In WO-A-2013/093285, a method is described for producing a turbine engine shaft, in which a blank is drilled or pierced, an insert made from a material having a yield stress close to that of the material of the blank is inserted into the opening resulting from the drilling or piercing, the insert is crimped in the blank, the assembly is forged, and the insert is removed by machining, differential expansion or chemical etching.

SUMMARY

An aim of the present disclosure is to provide the manufacturers of hollow parts, which are often large and made from an expensive alloy, with a production method that on the one hand makes it possible to avoid the use of machining of this expensive alloy to create the majority of the hollow part, and on the other hand to nevertheless make it possible to form the internal space of the hollow part with a satisfactory dimensional precision, in particular if this internal space must have a variable diameter.

To that end, a method is provided for producing a hollow part made of a metal material having given yield stresses at given temperatures, characterized in that said method comprises the following steps:

preparing a blank having two ends, made up of said metal material of the hollow part, and at least one sacrificial mandrel made of a material that, at all temperatures at which the various simultaneous deformations of the blank and the sacrificial mandrel will take place, has a yield stress in the range from −30% to +20% of the yield stress of the material of the blank at said temperatures, preferably in the range from −15% to +10%, ideally in the range from −5% to +3%;

applying a punch on at least one of the ends of said blank in order to produce the expansion of at least a portion of said blank and to create at least one internal space inside said blank;

inserting a sacrificial mandrel in said one internal space of the blank;

crimping said sacrificial mandrel(s) in said blank;

producing, by co-forging, a simultaneous deformation of said blank and said at least one sacrificial mandrel, with a homothetic ratio K;

optionally producing at least one other additional simultaneous deformation of said blank and said at least one sacrificial mandrel;

and performing a machining in order to remove the at least one sacrificial mandrel and impart its final configuration to the internal space of the part.

Said simultaneous deformations of said blank and said at least one sacrificial mandrel can be done, for a deviation of the yield stresses of −30% to +20%, with a deviation relative to the strict homothety from −15% to +10% with, for a deviation in the yield stresses from −15% to +10%, a deviation relative to the strict homothety from −7% to +5%, and for a deviation in the yield stresses from −5% to +3%, a deviation relative to the strict homothety from −2.5% to 1.5%.

Said at least one other simultaneous deformation can comprise a die-stamping.

Said at least one other simultaneous deformation can comprise a drawing.

Said blank can have a symmetry of revolution.

Said blank can be cylindrical.

Said sacrificial mandrel, or at least one of said sacrificial mandrels, can be cylindrical.

Said blank can be heated before applying said punch.

Before applying said punch, said blank can be inserted into the container of a press, a space being arranged between said blank and the inner wall of said container to allow the expansion of said blank.

The punch and the sacrificial mandrel can be formed by the same part.

Said blank can be a Ti alloy of type Ti-10-2-3, said sacrificial mandrels can each be made from a steel chosen from steels of types E28-3 and E24-2.

In one variant embodiment, the blank is not expanded over its entire length and said sacrificial mandrel does not extend over the entire length of said blank, and said blank is turned over, said punch is applied on the other end of said blank, and the expansion of another portion of said blank is done by creating another internal space of said blank, and another sacrificial mandrel is inserted into said other internal space of said blank.

The preceding method may be used to produce a landing gear rod.

The preceding method may be used to produce a landing gear beam.

As will have been understood, the present disclosure involves replacing the needless portion of the main material of the future part, which makes up the initial ingot, with a less expensive material that will be able to be removed easily by partial or total machining thereof during the final production step of the part. This material is made in the form of a mandrel to be inserted into the blank of the part before the final steps of the shaping. This mandrel, unlike what was done most often in the prior art, is a consumable part intended to be removed during final production steps of the part. Additionally, this mandrel, which will be called a "sacrificial mandrel," has the particularity of deforming in a manner quantitatively comparable to what occurs for the main material of the part during the shaping by forging or die stamping at a given temperature, and ideally "homothetically," in any case "quasi-homothetically" relative to the latter. Large hollow parts, as previously stated, are not easy to produce using conventional methods, at least without sacrificing a significant volume of costly material. The present disclosure produces these hollow parts by using the conventional methods (forging, die stamping, etc.) and replacing a portion of the material of said part, portion that would in any case not be intended to be delivered to the client, with another material that is easy to implement and that will be less expensive than the material of the part.

"Quasi-homothetic" means that the ratio between the dimensions of the part and the sacrificial mandrel is substantially preserved over all of the sections of the part during the shaping thereof. This condition is met if the yield stresses of the two materials involved, for a given deformation ratio $\varepsilon$ (it will be recalled that the deformation ratio $\varepsilon$ of a material is given by the formula $\varepsilon=\ln$ (initial section/final section), ln being the natural logarithm) and at the temperatures at which the various shaping steps are carried out (these temperatures are not necessarily identical for all of the steps) are relatively similar. The choice of the material of the sacrificial mandrel must be made accordingly.

Quasi-homothety within the meaning of the present disclosure must be understood as meaning that the dimension actually obtained does not deviate by more than ±10%, which would procure a strict homothety of the deformation of the material.

Additionally, one important particularity of the present disclosure is that the piercing of the blank is done without removing material, using a punch applied on one end of the blank and which causes an expansion of said blank. In this way, any loss of the generally expensive material making up the blank is avoided. The only loss of material can only relate to the machining of the sacrificial mandrel, which can be made from a material that is significantly less expensive than that of the blank.

According to the present disclosure, the sacrificial mandrel does not need to behave exactly like a conventional shaping tool, the dimensions of which remain substantially unchanged between the beginning and the end of the transformation. It must deform at the same time as the blank of the part, which means that it cannot in any case be reused to produce another part similar to the first and there are no serious drawbacks if it is destroyed after the shaping. The chippings from the sacrificial mandrel will be able to be recycled in a melting furnace, for example to contribute to producing another sacrificial mandrel. In practice, this sacrificial mandrel will often be able to be made from a material that is significantly less expensive than the material of the part, and the financial drawbacks of using a sacrificial mandrel will be minimal relative to the savings on the material and the method for producing the part that can be achieved through this use of a sacrificial mandrel according to the present disclosure.

It is preferable for the sacrificial mandrel to deform more, preferably slightly more, than the blank of the part during the transformation, so that its yield stress (the stress from which a plastic deformation is obtained) is, at that moment, less than that of the material of the part (knowing that the higher the yield stress is, the more difficult the material is to shape).

It should be noted that the yield stress of a material, at given temperature and deformation speed, depends substantially on the deformation ratio that is applied to said material. It is possible that for low deformation ratios, a material of the given part has a higher yield stress than a material of the given sacrificial mandrel, and that for these same two materials, it is the opposite for high yield stresses. This is for example what happens for the Ti 10-2-3 alloy and the E24-2 steel that are given as examples later.

In general, the yield stress of the sacrificial mandrel at the temperature of each of the transformations that the blank of the part and the sacrificial mandrel simultaneously undergo, and for the deformation ratio provided during each of these steps, must be inclusively between that of the material of the part −30% and that of the material of the part +20%, preferably between that of the material of the part −15% and that of the material of the part +10%, ideally between that of the material of the part −5% and that of the material of the part +3%. A difference of ±20% in the deformation ratios c will create a difference of ±10% in the transformation ratio, that is to say, in the ratio between the dimensions of the part or the sacrificial mandrel before and after the transformation.

It will be noted that these ranges are not centered on zero. This is because as we have seen, it is generally preferable for the material of the sacrificial mandrel to have a greater capacity to be deformed than the material of the part to be shaped. If the mandrel behaves like a tool (in other words, deforms significantly less than the part to be formed), there is a risk of structural (microstructure) modification problems of the part to be formed. If the mandrel has a very low yield stress (in other words, if it is too deformable relative to the part to be formed), there is a risk of not being able to respect the dimensional requirements on the final part.

In the case of parts with a relatively complex shape for which the deformation ratio differs depending on the portions of the part, the portion undergoing the greatest deformation must serve as a reference in order to determine the optimal ratio between the yield stresses of the two materials.

For certain materials, such as Ti alloys of type Ti-10-2-3 (Ti alloy with 10% V, 2% Fe and 3% Al, these content levels being given in weight % like all of the content levels of the different elements of the various alloys that will appear in the remainder of this text), which is one of the known materials particularly affected by the present disclosure, the yield stress, at a given temperature, can vary fairly significantly as an inverse function of the deformation ratio. Thus, for Ti-10-2-3, at 750° C., this yield stress is 200 MPa for a deformation ratio close to zero, 160 MPa for a deformation ratio of 0.5 and 120 MPa for a deformation ratio of 2. The yield stress is determined by hot tensile tests according to standard NF EN ISO 6892-2.

The choice of the materials for the blank of the part and the sacrificial mandrel will also determine the deviation relative to the strict homothety of the deformations that will be observed during the performance of the method according to the present disclosure. The homothety of the deformations is a result of the initial and final homotheties between part and mandrel, in particular when these are parts of revolution.

If the deviation between the yield stresses, at the temperatures at which the deformations simultaneously involving both materials take place, is on the order of ±20%, the deviation relative to strict homothety between the deformations of the blank of the part and the sacrificial mandrel is on the order of ±10%. It has been seen that this limit of ±10% was considered the deviation relative to a strict homothety of the deformations that is acceptable in the method according to the present disclosure.

Typically, for a deviation in the yield stresses from −30% to +20%, the deviation relative to strict homothety will be no more than from −15% to +10%. A deviation greater than −30% on the yield stresses will therefore not lead to a satisfactory homothety of the deformations.

Likewise, for a deviation in the yield stresses from −15% to +10%, the deviation relative to strict homothety will be no more than from −7% to +5%.

Likewise, for a deviation in the yield stresses from −5% to +3%, the deviation relative to strict homothety will be no more than from −2.5% to +1.5%.

In general, the higher the deviation is between the yield stresses, the higher are the deviation risks relative to strict homothety. If the sacrificial mandrel deforms little (in any case less than the blank of the part), and therefore behaves like a true shaping tool, there is a risk of unwanted modification of the microstructure of the blank. Conversely, if the sacrificial mandrel deforms too much, there is a risk of being unable to respect the dimensional requirements on the blank of the part after shaping thereof.

The examples according to the present disclosure that will be given below have been implemented with a standard deformation speed of 0.5 $s^{-1}$, but the present disclosure is not limited to the use of a deformation speed of this order. A deformation speed of up to 1.2 $s^{-1}$ would for example be conceivable.

Non-limiting examples for example include, as [material of the alloy; material of the mandrel] pairs, and as transformation temperature of these pairs, the following examples:

For the part: Ti-10-2-3 alloy (alloy of Ti with 10% V, 2% Fe and 3% Al); and for the sacrificial mandrel: steel of metal construction of type E28-3 (also referred to by references St44-3U and 1.0143) with C≤0.18%; Mn≤1.5%; P≤0.035%; S≤0.035%; N≤0.012%; Cu≤0.55%; remainder: Fe; carbon equivalent:≤0.42%; transformation temperature: 750° C.;

For the part: Ti-10-2-3 alloy; for the sacrificial mandrel: steel of metal construction of type E24-2 (also referred to by references St37-2 and 1.0037) with C≤0.17%; Si≤0.30%; Mn≤1.40%; P≤0.045%; S≤0.045%; remainder: Fe; transformation temperature 750° C.

Of course, it must be understood that the content levels in terms of alloy elements and the temperatures that are given here are not very strict values, and that deviations relative to these values are accepted as long as, in actual fact, the yield stresses of the various materials at their actual transformation temperature are within the ranges, whether mandatory or preferred, that have been indicated.

These choices and their results can be summarized in table 1.

TABLE 1

Examples of choices of pairs of material for the part to be formed/material for the sacrificial mandrel, and results of their tests

| | Material | | Transformation | Yield stress (MPA), deformation ratio 0.5, deformation temperature | | Deviations |
|---|---|---|---|---|---|---|
| Examples | Part | Mandrel | temperature | Part | Mandrel | Part/mandrel |
| 1 | Ti-10-2-3 | E28-3 | 750 | 160 | 150 | −6% |
| 2 | Ti-10-2-3 | E24-2 | 750 | 160 | 140 | −13% |

It will be noted that at 750° C. for the low deformation ratios (0.5), the tested mandrels made from steels E28-3 and E24-2 have higher yield stresses than those of the part made from alloy Ti-10-2-3. For high deformation ratios at 750° C., the experiment shows that the reverse occurs. In the case of a mandrel made from E24-2, the yield stresses of the part and the mandrel are substantially equal for a deformation ratio of 0.8, at 750° C. and for a deformation speed of 0.5 $s^{-1}$.

BRIEF SUMMARY OF THE DRAWINGS

The invention will be better understood upon reading the following description, given in reference to the following appended figures:

FIG. 1, which schematically shows the blank and the sacrificial mandrel used in a first variant of the method according to the present disclosure to produce a part with symmetry of revolution, hollow over its entire length;

FIG. 2, which shows said blank in longitudinal sectional view after it has been drilled over its entire length in light of the following production step;

FIG. 3, which shows the drilled blank in longitudinal sectional view placed in the container before the expansion operation, and the punch preparing to be used to perform the expansion of the blank in the container;

FIG. 4, which shows, in the same manner, the blank in the process of expansion, before the centering ring is removed that keeps the blank in position in the first stages of the expansion;

FIG. 5, which shows the blank in the container, at the end of the expansion phase;

FIG. 6, which shows, in the same manner, the blank in the container, the sacrificial mandrel having been inserted into the space arranged by the punch to that end;

FIGS. 10 to 16, which schematically show, during the implementation of a second variant of the present disclosure for producing a landing gear rod, the steps that make it possible to obtain a blank-sacrificial mandrel assembly in which the sacrificial mandrel is not present over the entire length of the blank;

FIGS. 23 to 30, which schematically show, during the implementation of a third variant of the present disclosure for producing a landing gear beam, the steps that make it possible to obtain an assembly formed by a blank and two sacrificial mandrels that leave a portion of the blank in which a sacrificial mandrel is not present;

DETAILED DESCRIPTION

Figure 7:
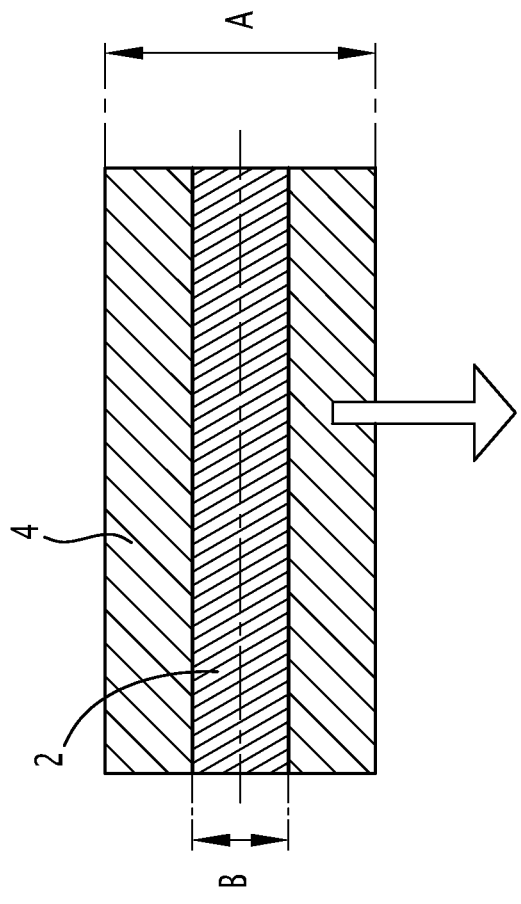
FIG. 7, which shows, in longitudinal sectional view, the assembly formed by the blank and the sacrificial mandrel upon removal from the container.

It must be understood that the dimensions of the various parts that will be given in the exemplary embodiments that follow will be the dimensions that are or would be measured when cold, therefore independently of the actual dimensions that the parts in question would have at the various stages of production, if they are in a heated condition during the described step.

In a first exemplary embodiment, we will describe a method using a single mandrel, in the case at hand a through mandrel, to produce a hollow part.

First, produced separately, visible in FIG. 1, are:

a blank 1 made from Ti alloy Ti-10-2-3, with a diameter D of 430 mm and a length of 2366 mm; this is the material from which the part will be made;

and a blank 2 made from steel E28-3 or E24-2 with a diameter B of 200 mm and a length of 2366 mm, which is intended to make up the sacrificial mandrel.

Then a hole is drilled with a diameter from about 20 to 25 mm along the axis of the blank 2 made from a Ti alloy, over its entire length, in order to obtain a through opening 3. The aim of this step, which is optional but highly advisable at least for very long parts (with a length on the order of 10 times the diameter of the part or more), is to serve to prime the insertion of the punch 10 that will perform the expansion of the blank 2 while preventing it from deviating from its nominal path during this expansion. One thus obtains a drilled blank 4, visible in FIG. 2.

Then the blanks 4, 2 are heated, to bring them to temperatures suitable for the treatments they will undergo and which will be seen later. These temperatures are of course able to vary based on local conditions, in particular the transfer times between the furnaces and the expansion installation that will be used, and the times that the blanks 4, 2 spend before undergoing the transformation. These temperatures will be able to be determined by computer simulations and routine tests.

Then the heated drilled blank 4 is placed in a press. In the illustrated example, the press comprises a cylindrical container 5, placed vertically in the example illustrated in FIG. 3, this container 5 in turn comprising a central housing with diameter A equal to 487 mm, therefore greater than that D of the drilled blank 4 and greater than or equal to the largest diameter A1 that the final hollow part will assume, so as to leave a free space 6 between the drilled blank 4 and the inner wall of the container 5 for the future expansion of the drilled blank 4. A centering ring 7 is placed in the lower part of the container 5 to receive the lower end 8 of the drilled blank 4. The centering ring 7 has an outer diameter equal (to within a slight play, allowing it to be placed and removed) to the inner diameter A of the container, and an inner diameter equal (to within a slight play) to the diameter of the drilled blank 4, for example 440 mm in the present embodiment. The upper end 9 of the centering ring 7 is preferably beveled to guide the drilled blank 4 inside the centering ring 7 during its descent into the container 5. FIG. 3 also shows the expansion punch 10, which is, for the moment, nonoperational and is kept above the container 5 while waiting for the following production step. The diameter of this punch 10 is greater than that B of the sacrificial mandrel 2 in order to allow the future insertion of the sacrificial mandrel 2 into the space created by the punch 10. For example, for a nominal diameter of the sacrificial mandrel 2 of 200 mm, it is possible to provide a diameter of 205 mm for the punch 10, with the understanding that the sacrificial mandrel 2 will be used hot and will then have a diameter of about 202 mm, while the punch 10 will be used in an initially cold state, and will only experience a small expansion during its use.

Although not necessarily mandatory, the use of the container 5 and the centering ring 7 is a preferred embodiment, since it makes it possible to ensure good dimensional control of the shaping of the drilled blank 4.

The following step, shown schematically in FIG. 4, is a first stage of the expansion of the drilled blank 4 using the punch 10. The latter has a lower end 11 with a conical shape that facilitates the penetration and centering of the punch 10 in the drilled blank 4. The tip of the cone 11 is inserted into the through opening 3, and the punch 10 descends while gradually pushing back the hot metal making up the drilled blank 4 against the inner wall of the container 5 while causing it to fill in the space 6 as the punch 10 advances. This expansion of the drilled blank 4 is therefore done without any material removal. The situation shown in FIG. 4 is therefore achieved, in which the upper part of the drilled blank 4 has an outer diameter substantially equal to A, but without a very strong pressure being exerted on the container 5, while the lower part of the drilled blank 4 has not yet experienced this deformation, since it has not been affected by the progression of the punch 10.

Then, the centering ring 7 is removed, which is no longer useful, since the upper part of the drilled blank 4 now fills in all of the space 6 up to the level where the punch 10 is formed, and is therefore itself able to ensure the centering of the drilled blank 4 in the container 5. Next, the punch 10 is lowered until it emerges from the lower surface of the container 5 after it has completed the expansion of the drilled blank 4 over its entire length so as to cause it to fill the entire space 6. As shown in FIG. 5, one thus has a drilled blank 4, with an internal space 12 that uniformly has a diameter larger than that B of the sacrificial mandrel 2, as stated above. The punch 10 is then released.

In the following step, seen in FIG. 6, the sacrificial mandrel 2, with diameter B, is inserted into said internal space 12 of the drilled blank 4. The sacrificial mandrel 2 is not necessarily hot itself, but the drilled blank 4 must still be hot itself. There is a play between them of at least 3 mm to allow this insertion, which the crimping that will follow must be able to bridge.

Then, for example using the punch 10, a slight compression of the sacrificial mandrel 2 is done, which leads to a crimping of said sacrificial mandrel 2 in the drilled blank 4 such that they constitute an assembly that is inseparable without a deliberate outside action.

Then the drilled blank 4/sacrificial mandrel 2 assembly, which is as shown in FIG. 7 with a homothetic ratio K that is equal to A/B, is removed from the container 5, and heated to a temperature on the order of 750° C., which allows drilling thereof.

Figure 8:
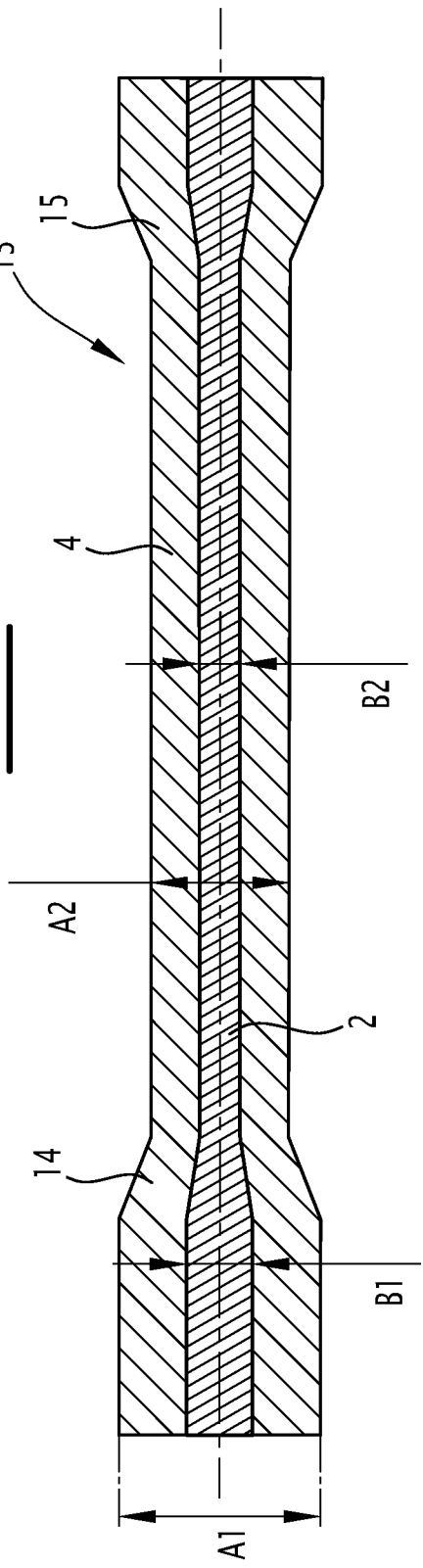
FIG. 8, which shows said assembly in longitudinal sectional view after co-forging thereof.

A co-forging of this assembly is next done in order to obtain, in the non-limiting example shown in FIG. 8, a blank 13 of variable section along its length. The forging leads to a generalized decrease in the outer diameter of the drilled blank 4/sacrificial mandrel 2 assembly and an increase in its length. This decrease is not homogeneous in that, at both ends of the blank 13, a portion is arranged where the outer diameter of the blank 13 is equal to a value Al and where the diameter of the sacrificial mandrel 2 is equal to a value B1. The median part of the blank 13, which, in the illustrated example, represents the largest portion of its length, in turn has an outer diameter A2 conjugated to a diameter of the sacrificial mandrel 2 equal to B2. Between the ends and the median part of the blank 13, there are transition zones 14, 15 where the diameters of the blank 13 and the sacrificial mandrel 2 both decrease progressively.

According to the present disclosure, during the drilling, a homothetic ratio is preserved on all of the portions of the blank 13 equal to K between the respective diameters of the blank 13 and the sacrificial mandrel 4. One thus has the equalities K=AB=A1/B1=A2/B2, and the transition zones 13, 14 are also affected by this equality.

Die stamping is next performed of the blank 13/sacrificial mandrel 4 assembly on a die stamping press, in order to give the blank 13 its final outer dimensions.

Figure 9:
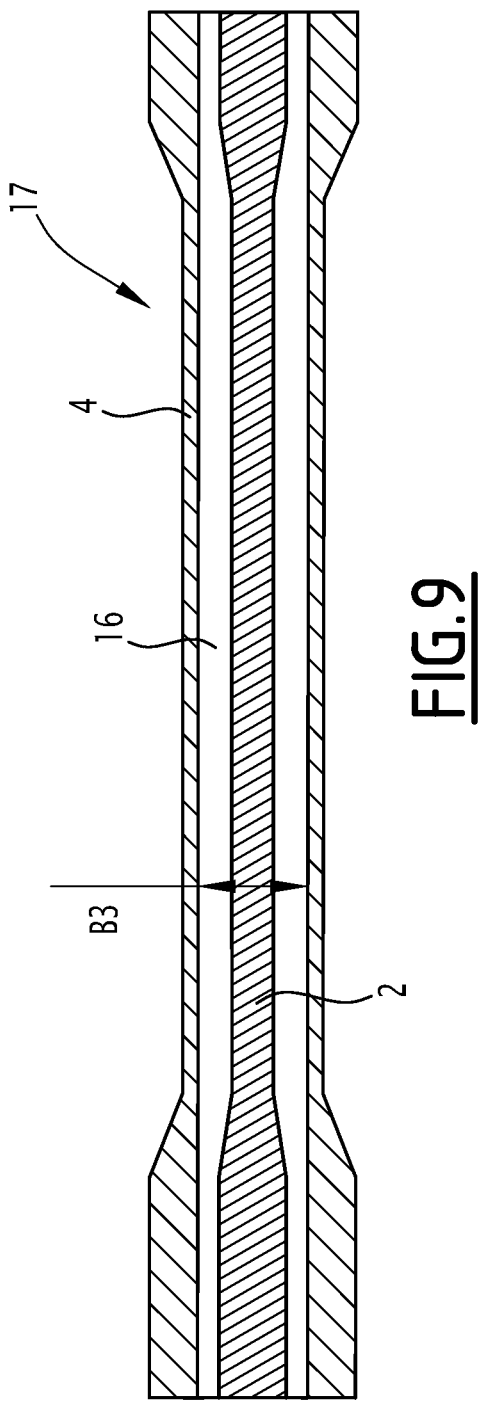
FIG. 9, which shows said assembly in longitudinal sectional view during the drilling operation that makes it possible to destroy the sacrificial mandrel and to adjust the inner diameter of the part produced from the blank.

Machining of the axial drilling is next done, shown during performance in FIG. 9. The purposes of this are to:

Remove the sacrificial mandrel 2; to that end, it is possible to machine it by turning all of it into chippings, or only machining the periphery of it, for example by hollow core drilling, so as to allow the removal from the blank 13 of the part of the sacrificial mandrel 2 that has remained solid;

And give the internal space 16 of the final part 17 a unique diameter (in the illustrated example) of well-defined value B3, here again by removing material in chippings form.

It is therefore still may be necessary to perform machining in order to obtain the internal space 16 of the final part 17. However, relative to the machining operations done during conventional methods previously cited, the present disclosure makes it possible to considerably decrease the amount of metal chippings intended to make up the final part 17 to be removed in the form of chippings, which has therefore been prepared superfluously in terms of quantity of material, and also in terms of amount of energy necessary to heat said material (although in the present disclosure, it may also be necessary to reheat the sacrificial mandrel 2, such that the overall energy savings will not be significant if the sacrificial mandrel 2 does not have a significantly lower heat capacity than that of the alloy making up the final part 17). These chippings can still be recovered by being recycled in a melting furnace. They are, granted, mixed with the chippings resulting from the removal by machining of the sacrificial mandrel 4. However, it is easily possible to separate the two types of chippings using a magnetic sorting method, if the sacrificial mandrel 4 is made from steel and if the part to be produced is made from a nonmagnetic alloy. A densimetric or gravimetric separation is also conceivable, when the materials making up the final part 17 and the sacrificial mandrel 4 have a sufficient density contrast to that end, which is the case for, respectively, the Ti alloys and steels, which constitute favored, but non-exclusive examples of materials usable in the application of the present disclosure.

The process of producing the final part 17 can end, in a known manner, with a heat treatment intended to give it its final metallurgical microstructure, and by machining, in particular of the ends of the final part 17, intended to give them their desired final shape for the anticipated use of the final part 17.

In a variant of the method according to the present disclosure, it is provided not to use a completely through sacrificial mandrel like in the preceding version shown in FIGS. 1-9, but a blind sacrificial mandrel, to produce a landing gear rod conventionally comprising a shaft and a yoke.

Figure 10:
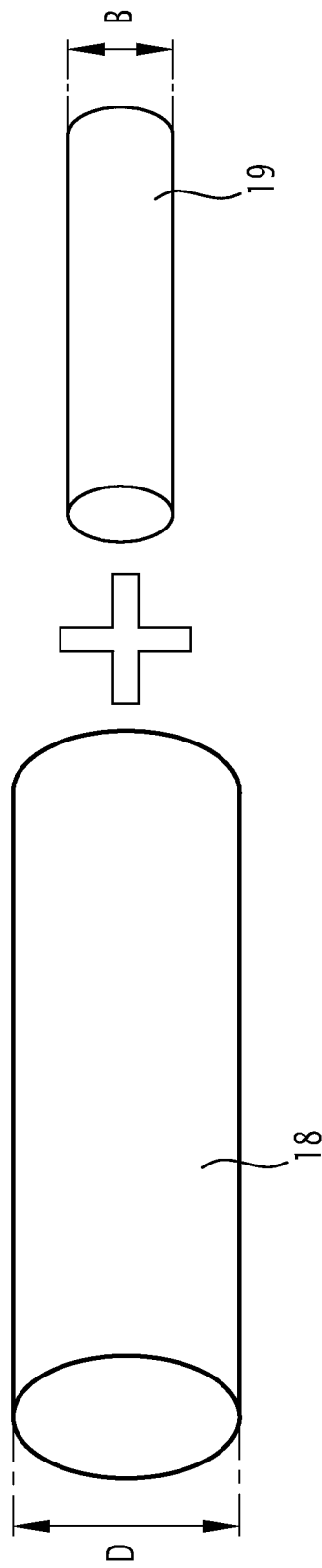

First, produced separately, visible in FIG. 10, are:
A blank 18 made from Ti alloy Ti-10-2-3, with a diameter D of 430 mm and a length of 2366 mm (or a section of 14.52 dm$^2$, a volume of 343.59 dm$^3$, and a mass of 1584 kg); this is the material from which the part will be made;
And a blank 19 made from steel E28-3 or E24-2 with a diameter B of 200 mm and a length of 1150 mm.

Figure 11:
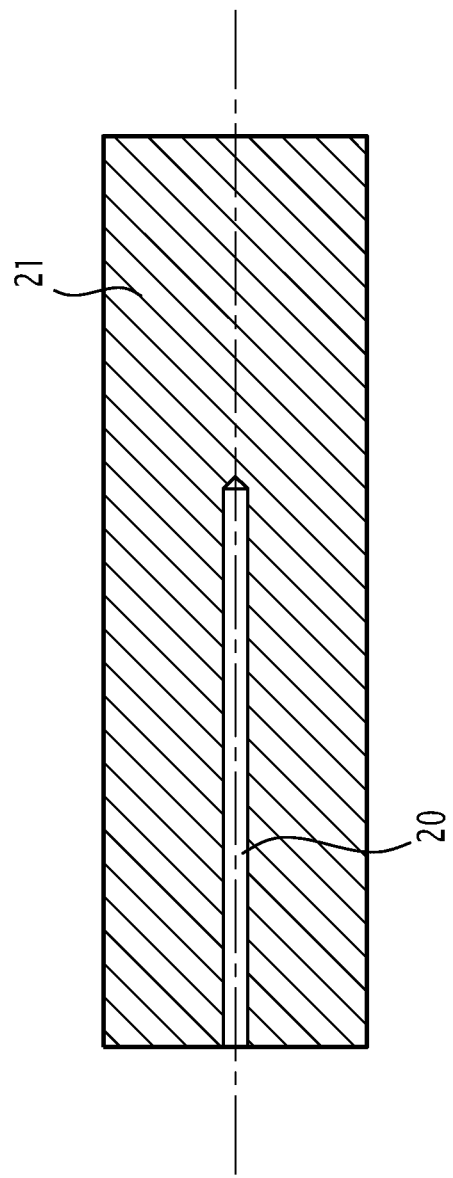

Then a hole is drilled with a diameter from about 20 to 25 mm in the axis of the blank 18 made from a Ti alloy, over a length of 1150 mm, in order to obtain a blind opening 20. The aim of this step, which is optional but highly advisable, in particular for long parts, is to serve to prime the insertion of the punch 10 that will perform the expansion of the blank 18 while preventing it from deviating from its nominal path during this expansion. One thus obtains a partially drilled blank 21 made from Ti alloy, visible in FIG. 11.

Then the blanks 21, 19 are heated, like in the preceding variant, to bring them to temperatures suitable for the treatments they will undergo and which will be seen later.

Figure 12:
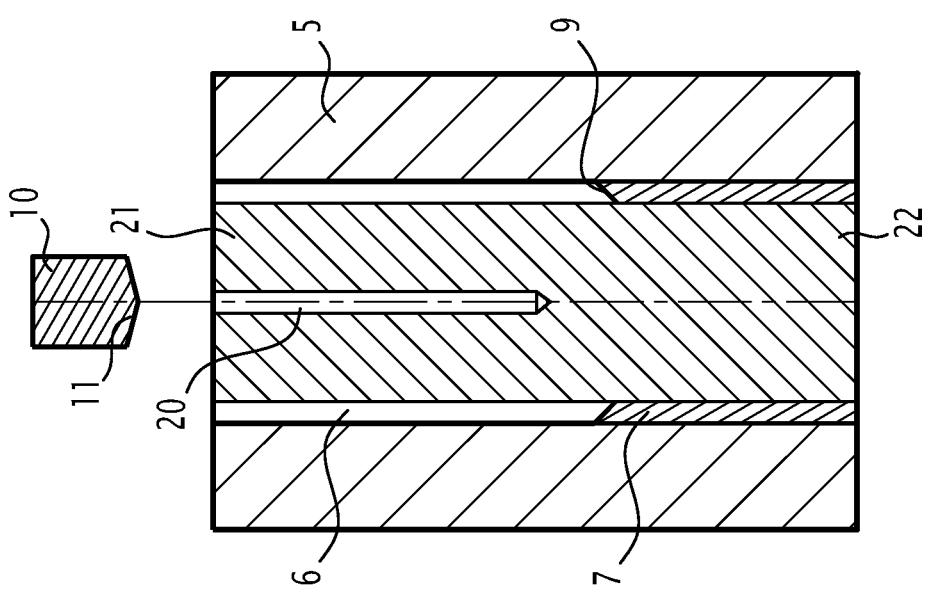

Then the heated partially drilled blank 21 is placed in a press. In the illustrated example, the press comprises a cylindrical container 5, placed vertically in the example illustrated in FIG. 12, this container 5 in turn comprising a central housing 6 with diameter A=490 mm, therefore greater than that D=430 mm of the partially drilled blank 21 and greater than or equal to the largest diameter A1 that the final hollow part will assume. A centering ring 7 is arranged in the lower part of the container 6 to receive the non-drilled lower end 22 of the partially drilled blank 21. The centering ring 7 has an outer diameter equal (to within a slight play, allowing it to be placed and removed) to the inner diameter A of the container, and an inner diameter of 440 mm, therefore equal (to within a play of 10 mm) to the diameter of the partially drilled blank 21. The upper end 9 of the centering ring 7 is preferably beveled to guide the partially drilled blank 21 inside the centering ring 7 during its descent into the container 5. FIG. 12 also shows the expansion punch 10, which is, for the moment, nonoperational and is kept above the container 5 while waiting for the following production step. The diameter of this punch 10 is 210 mm, therefore greater than that B=200 mm of the sacrificial mandrel 19 in order to allow the future insertion of the sacrificial mandrel 19 into the space created by the punch 10.

Figure 13:
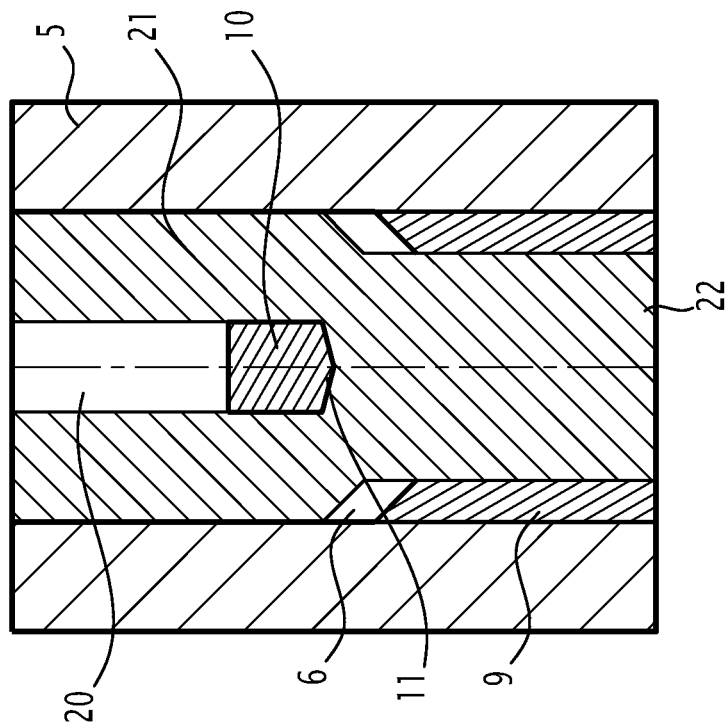

The following step, shown schematically in FIG. 13, is a first stage of the expansion of the partially drilled blank 21 using the punch 10. The tip of the cone 11 is inserted into the blind opening 20, and the punch 10 descends while gradually pushing back the hot metal making up the partially drilled blank 21 against the inner wall of the container 5 while causing it to fill in the space 6 as the punch 10 advances. This expansion of the partially drilled blank 21 is therefore done without any material removal. The situation shown in FIG. 13 is therefore achieved, in which the upper part of the drilled blank 21 has an outer diameter substantially equal to A (483 mm instead of 490 mm for A), while the lower part of the drilled blank 4 has not yet experienced this deformation, since it has not been affected by the progression of the punch 10. And the diameter of the original blind opening 20 is increased up to about 210 mm, or the diameter of the punch 10. The crimping between the blank 21 and the container 5 must not be too pronounced so as to allow an easy later removal of the blank 21.

Then, as shown in FIG. 14, the punch 10 is removed and the sacrificial mandrel 19, previously heated to 750° C., is inserted into the blind opening 20 thus widened, the blank 21 in turn being hot. And like in the preceding variant, this insertion is followed by a crimping done using a slight pressure exerted, for example, using the punch 10.

Figure 15:
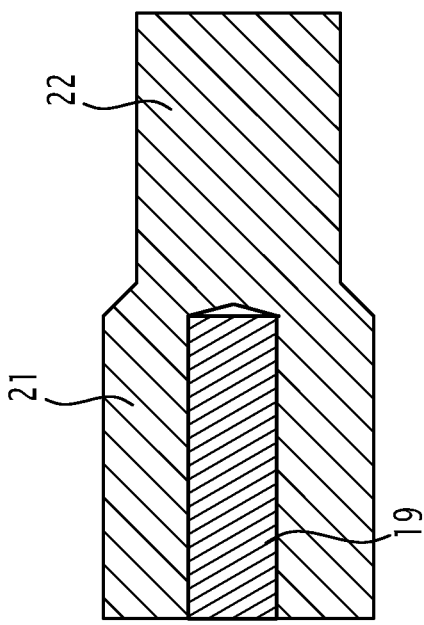

Then the blank 21 is removed from the container 5, and therefore assumes the form shown in FIG. 15, with its partially drilled portion containing the sacrificial mandrel 19, having an outer diameter, when cold, of 478 mm (therefore slightly smaller than the cold inner diameter of the container, to allow an adequate play between them), the sacrificial mandrel 19 having substantially retained its cold diameter of 200 mm. There is therefore a ratio between these two diameters K=478/200=2.39. The non-drilled part of the mandrel 21 has a diameter of 430 mm when cold, like initially.

Figure 16:
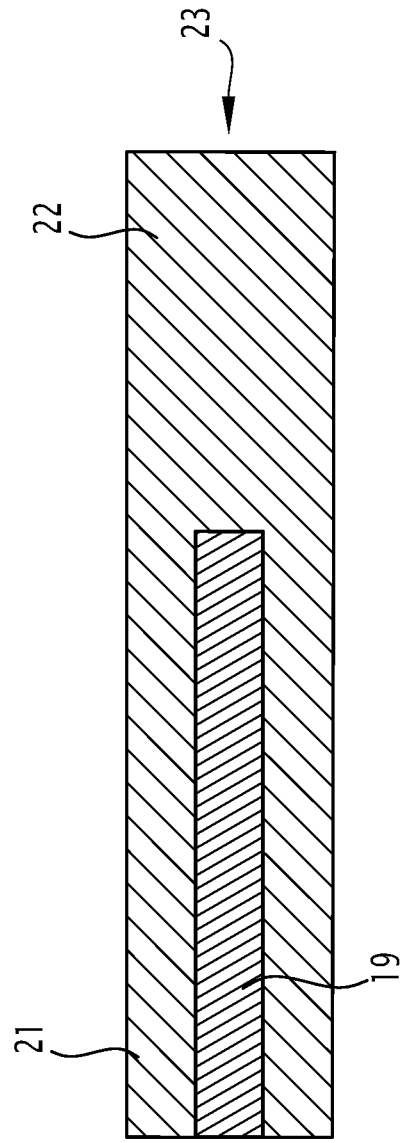

Co-forging of the part 21/sacrificial mandrel 19 assembly is next done at 750° C. in a press, until the assembly is given a cylindrical outer shape, the diameter of which will be compatible with the tooling for upsetting the head of the rod, as will be seen later. In the example shown in FIG. 16, an assembly 23 is obtained with a length of 2610 mm and a uniform outer diameter of 430 mm. The co-forging has reduced the cold diameter of the sacrificial mandrel to 180 mm. There is therefore a ratio of K=430/180=2.39, which has therefore been retained relative to what it was before the co-forging.

Figure 17:
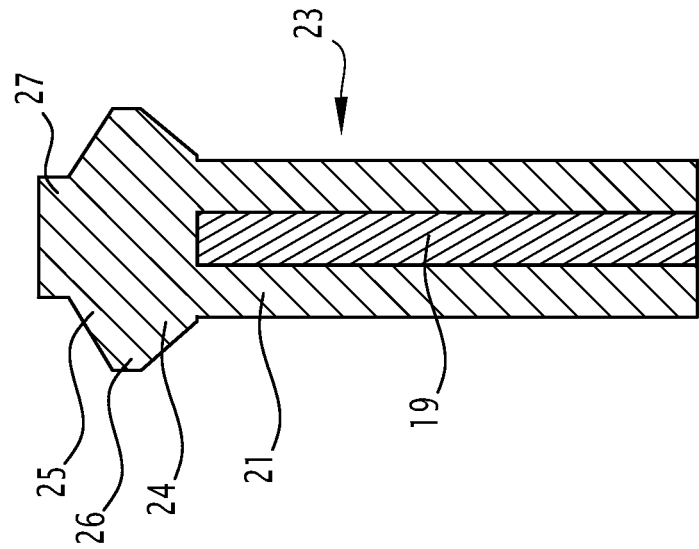
FIG. 17, which shows this same assembly after shaping by upsetting the head of the rod.

Then, the non-drilled portion 22 of the blank 21 is upset on a suitable tool to give it the shape and dimensions suitable for producing the yoke of the final part, as will be seen later. In the example shown in FIG. 17, this head comprises two frustoconical portions 24, 25 that are connected by a short cylindrical portion 26, and a short cylindrical portion 27 making up the end of the rod. The total length of the assembly 23 is then 2057 mm, knowing that the dimensions of the drilled portion of the blank 21 and the sacrificial mandrel 19 that it contains have not varied.

Figure 18:
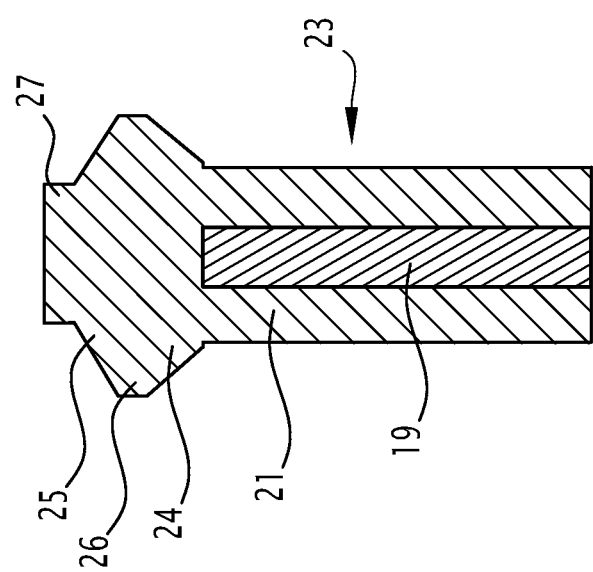
FIG. 18, which shows this same assembly after drawing of the shaft of the rod.

Next, at 750° C., drawing of the drilled portion of the blank 21 is done to cause it to go from an outer diameter of 430 mm to an outer diameter of 380 mm. At the same time, the ratio K=2.39 is kept: the diameter of the sacrificial mandrel 19 goes to 159 mm. FIG. 18 shows the result of this drawing.

Figure 19:
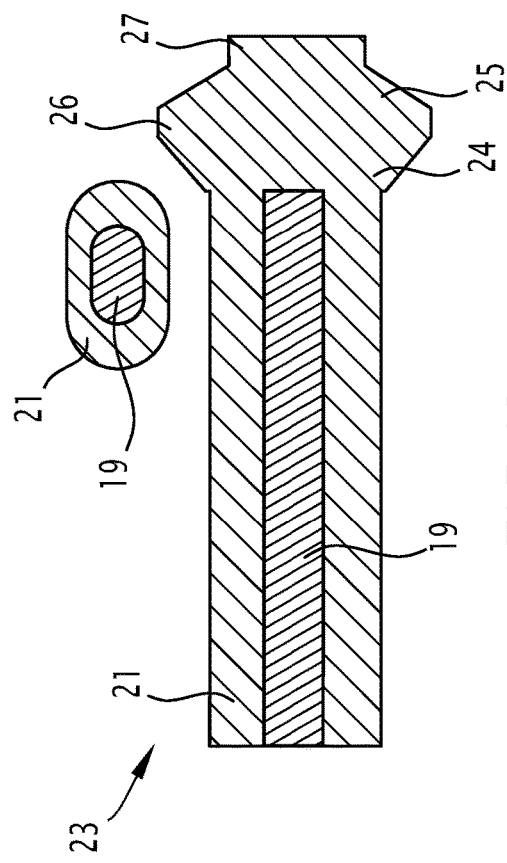
FIGS. 19 to 21, which show the shaping of said assembly by flattening in a press and edge stamping.

Then, as shown in FIG. 19, the drilled part of the blank 21 is flattened on a press at 750° C. in order to give it a total thickness of 280 mm. The length of this drilled part goes to 1915 mm and the total length of the assembly 23 to 2646 mm. The result is visible in FIG. 19.

Figure 21:
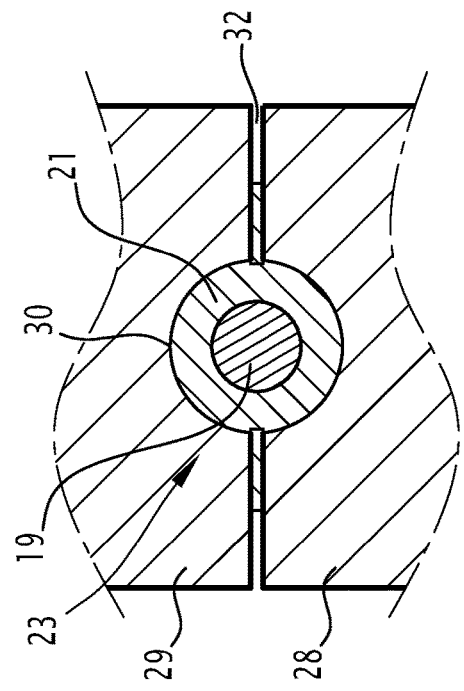
Figure 20:
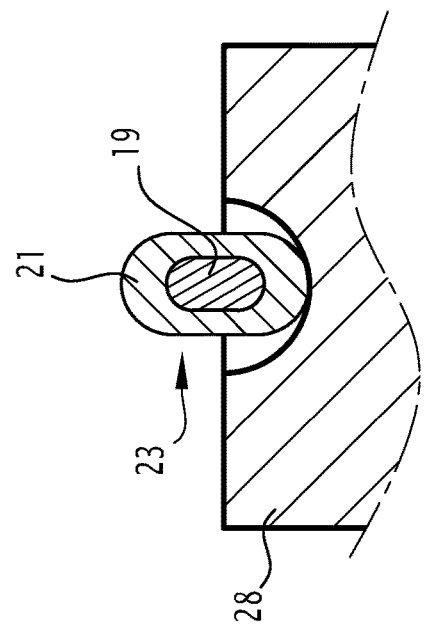
Figure 22:
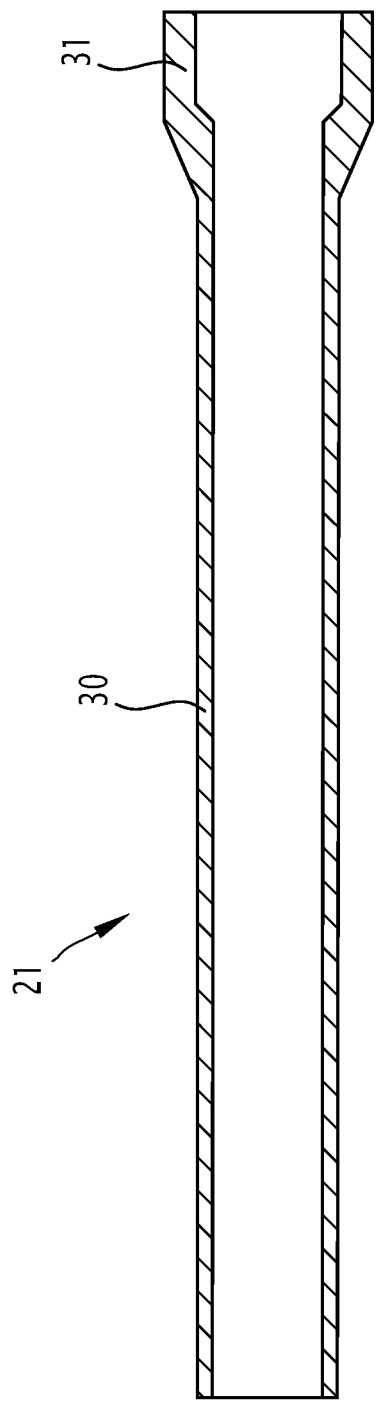
FIG. 22, which shows the final rod in longitudinal section view, drilled and machined.

Next, die stamping of the assembly is done to give the assembly 23 the desired outer shape for the landing gear rod. To that end, as shown in FIG. 20, the assembly 23 is placed on the lower part 28 of a die. Then, as shown in FIG. 21, the die is closed by pressing on its upper portion 29, and this imparts its final outer shape to the blank 21, with a shaft 30 once again having a circular section, with a homothetic ratio K=2.39 between the inner diameter of the blank 21 made from Ti and the outer diameter of the sacrificial mandrel 19 also being restored, and a yoke 31 that has the exact desired shape. Under the effect of the die stamping, a small amount of the material of the billet 21 is inserted in the gap 32 separating the two portions 28, 29 of the die.

Machining of the outside of the billet 21 makes it possible to remove the material that was inserted into the gap 32.

Next, an operation is performed that gives the billet 21 its final shape and dimensions. On the one hand, the inside of the blank 30 is drilled, to remove all of the sacrificial mandrel 19 and part of the metal of the blank 21 in the form of chippings, so as to give the shaft an inner diameter of 230 mm. Drilling is also done in the yoke 31 to give it the desired nominal inner diameter, which, in the illustrated example, is larger than that of the shaft 30. In the illustrated example, the transition between the nominal inner diameter of the yoke 31 and the inner diameter of the shaft 30 is done gradually, the bottom of the drilled cavity in the yoke 31 having a beveled shape.

The production normally ends with a heat treatment and final machining that gives the blank 21 its precise final dimensions and therefore transforms it into a landing gear rod.

In another variant of the present disclosure, for example intended to produce landing gear beams, it is possible to use two sacrificial mandrels, in the manner that will be explained.

Figure 23:
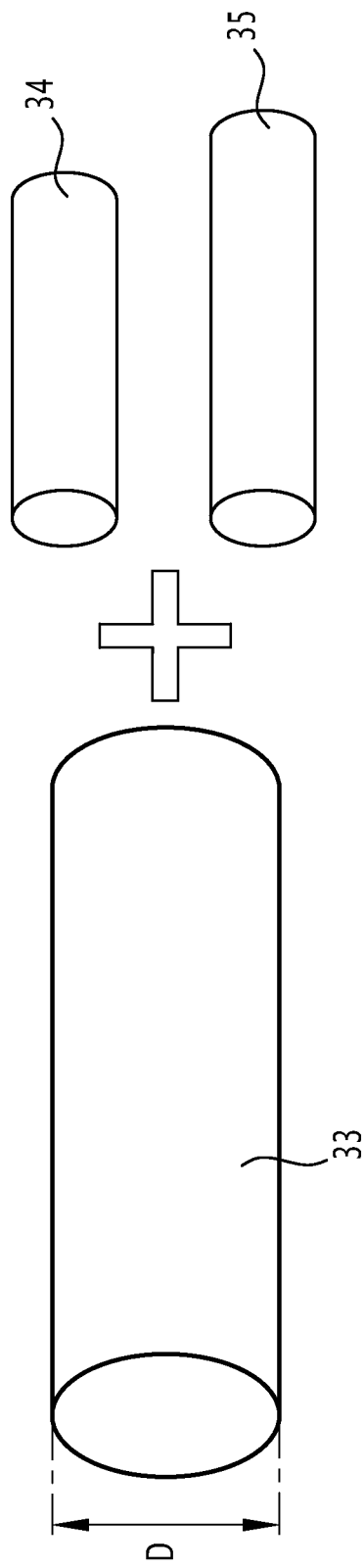

First, produced separately, visible in FIG. 23, are:

A blank 33 made from Ti alloy Ti-10-2-3, with a diameter D of 430 mm and a length of 1677 mm (section: 14.52 dm$^2$, volume: 243.53 dm$^3$, mass 1124 kg); this is the material from which the beam will be made;

And two blanks 34, 35 made from steel E28-3 or E24-2 with a diameter B of 200 mm and lengths of 640 and 750 mm, respectively intended to make up a first 34 and a second 35 sacrificial mandrel.

It must be understood that the fact that the two sacrificial mandrels 34, 35 have different lengths is only required by the desired geometry for the described exemplary beam to be produced. This variant of the method could very well use two sacrificial mandrels with the same length, if this was compatible with the geometry of the part to be produced.

It is not mandatory for the two sacrificial mandrels 34, 35 to be made from the same material, if there was an advantage in these materials having different yield stresses, for example because the targeted geometry for the final part required significantly different deformations for the portions shaped using each of the sacrificial mandrels 34, 35, and these different deformations were better ensured with sacrificial mandrels 34, 35 having different properties.

Figure 24:
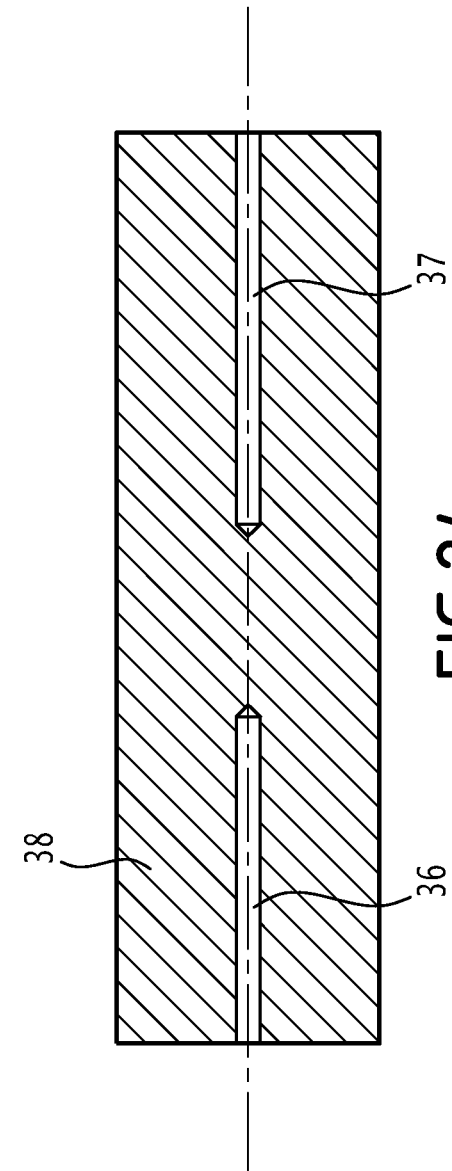

Then two blind holes 36, 37 with a diameter of about 20 to 25 mm are drilled along the axis of the blank 33 made from a Ti alloy, over a length of 630 mm for the first 36 and 747 mm for the second 37, in order to obtain two blind openings. The aim of this step, which is optional but highly advisable, in particular for the long parts, is also to prime the insertion of the punches that will perform the expansion of the blank. One thus obtains a partially drilled blank at each of its two ends 38, visible in FIG. 24.

Figure 26:
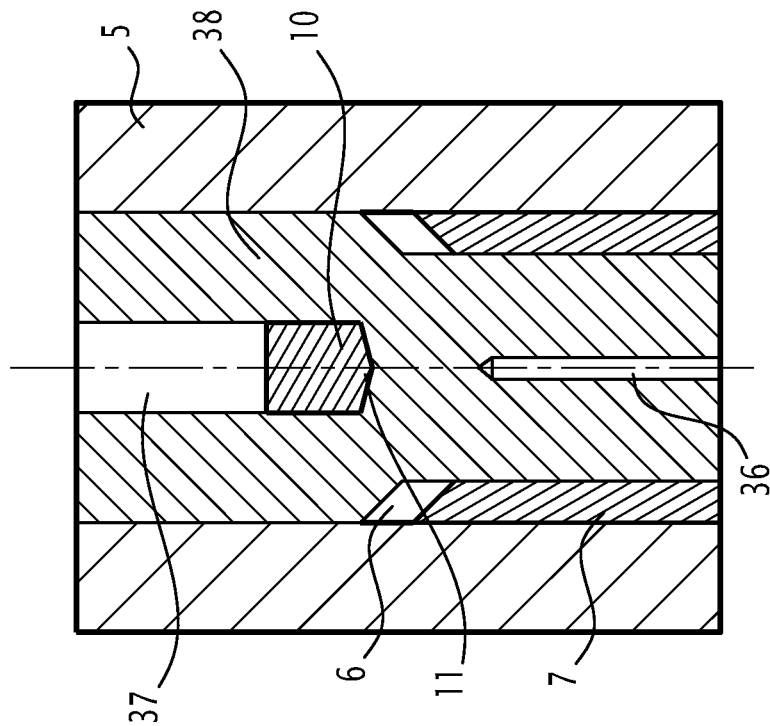
Figure 25:
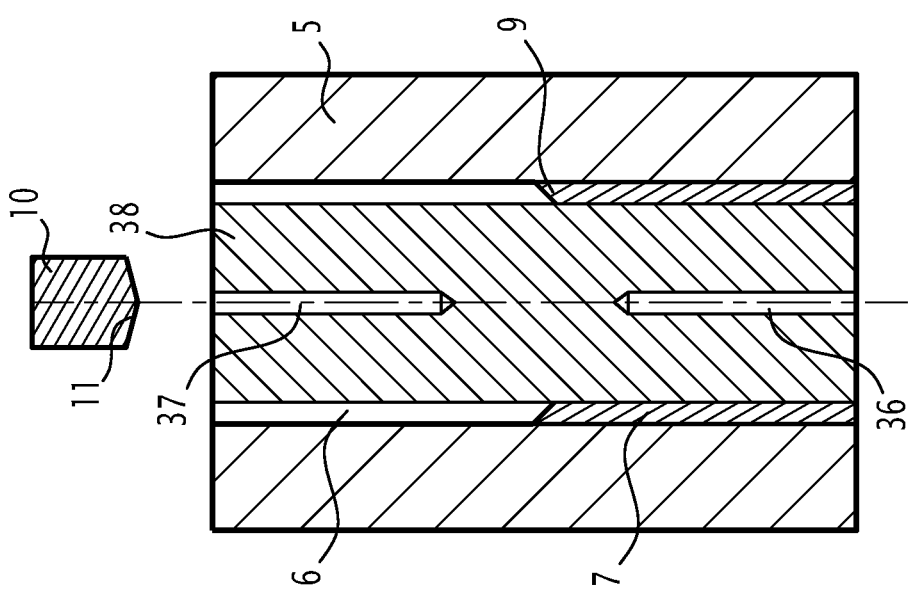
Figure 27:
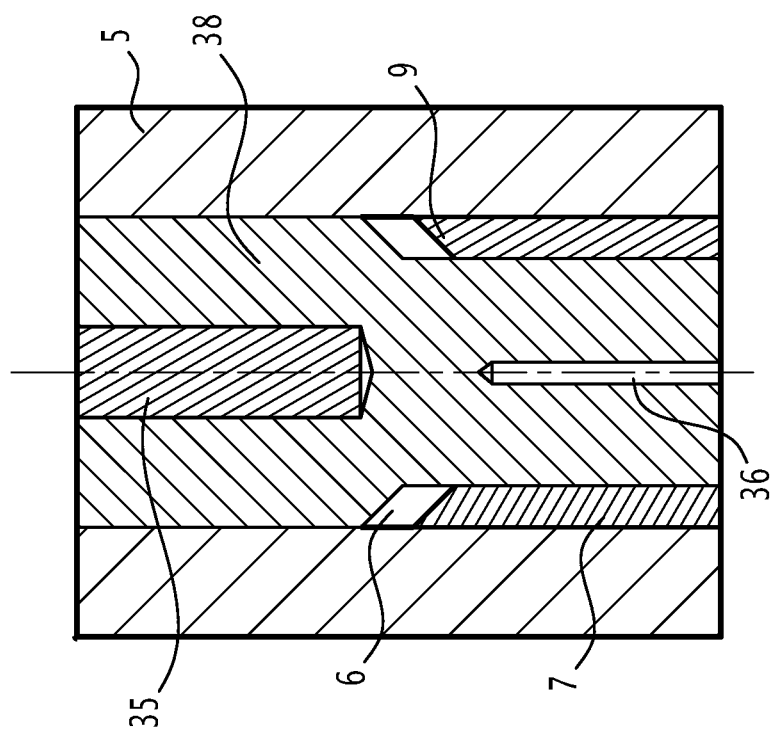

Then, in the illustrated preferred example, the partially drilled blank 38 is placed in a container 5 equipped with a centering ring 7, identical in terms of composition and dimensions to that used in the preceding examples. In the case illustrated in FIGS. 25 to 27, the side of the partially drilled blank 38 comprising the longest blind hole 37 is placed toward the upper portion of the container 5, such that this longest blind hole 37 is the first to be widened and elongated by the punch 10 during the step shown in FIG. 26, qualitatively corresponding to that shown in FIG. 13 for the preceding example. The punch 10 pushes the alloy of the blank 38 back against the inner wall of the container 5, without excessive crimping. It arranges an elongated and widened blind opening 37, the length of which makes it able to close the second sacrificial mandrel 35, that is to say, the longest sacrificial mandrel, prepared beforehand, as shown in FIG. 27. The second sacrificial mandrel 35 is next crimped, as previously explained regarding the other examples.

Then the blank 38 containing the second sacrificial mandrel 35 is removed from the container 5, the centering ring 7 is removed from the container 5, and the partially drilled blank 38 is reinserted into the container 5 with, this time, the side of the blank 38 comprising the shortest blind hole 36 toward the upper portion of the container 5. The centering of the blank 38 in the container 5 is now ensured by the portion of the blank 38 that was expanded during the preceding step. One is therefore in the situation of FIG. 28, with the punch 10 ready to widen the blind hole 36 and to expand the blank 38 in its portion comprising the shortest blind hole 36. Once the expansion is done, the first sacrificial mandrel 34, which is the shortest of the two sacrificial mandrels 34, 35, is inserted into the expanded hole 36, and one is in the situation of FIG. 29.

In other words, the blank 33 is not expanded over its entire length and said second sacrificial mandrel 35, the longest in the illustrated case, therefore does not extend over the entire length of said blank 33 during its insertion and the corresponding expansion of the blank 33. One next turns the blank 33 over and presses the punch 10 on the other end of the blank 33, performs the expansion of another portion of the blank 33 while creating another internal space within the blank 33, and inserts the first sacrificial mandrel 34, the shortest in the illustrated case, into said other internal space of the blank 33.

Figure 30:
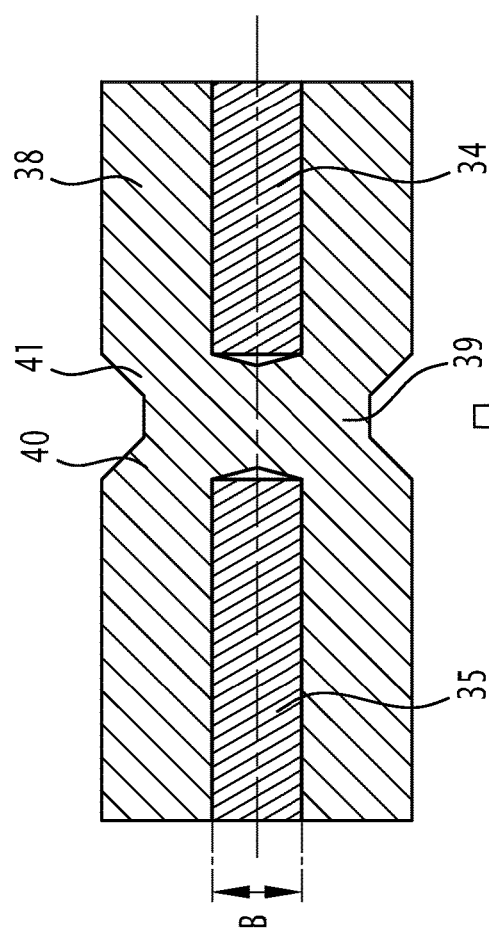

The assembly formed by the expanded blank 38 and the two sacrificial mandrels 34, 35 is removed from the container and, as better shown in FIG. 30, assumes the form of a blank 38 comprising two cylindrical portions each containing a sacrificial mandrel 34, 35 and connected by a non-perforated portion, comprising a cylindrical central portion 39 whose diameter is equal to the original diameter of the blank 38 and two frustoconical portions 40, 41 that connect it to the cylindrical portions containing the sacrificial mandrels 34, 35. The outer diameter of the blank 38 is 478 mm and the diameter of the sacrificial mandrels 34, 35 is 200 mm. The ratio K is therefore equal to 478/200=2.39.

Figure 31:
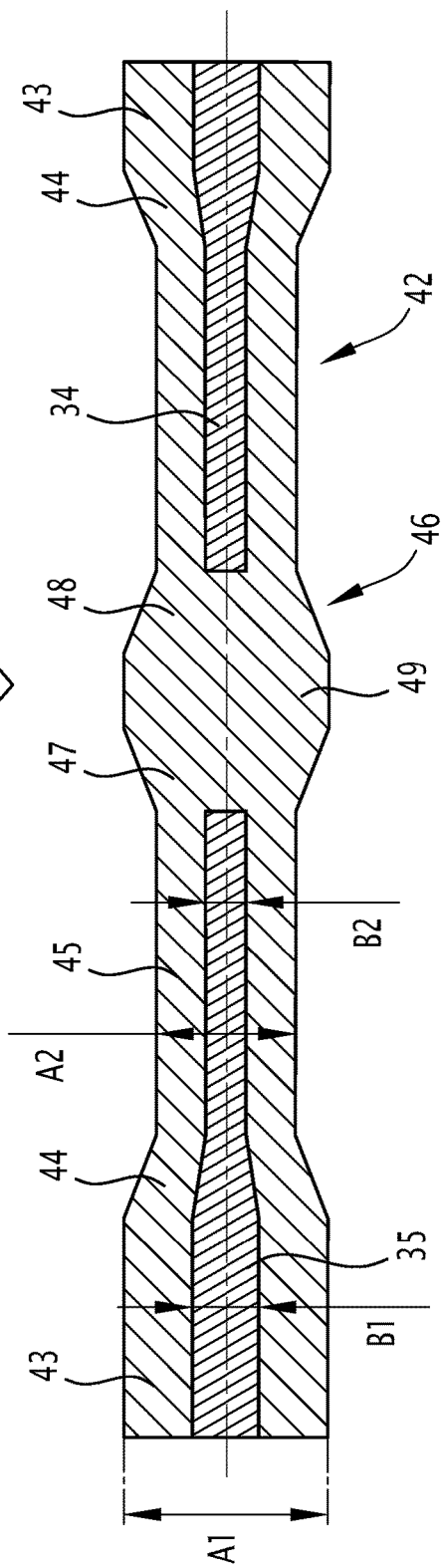
FIG. 31, which shows this same assembly after a co-forging that has given it an outer shape close to that of the final beam.
Figure 32:
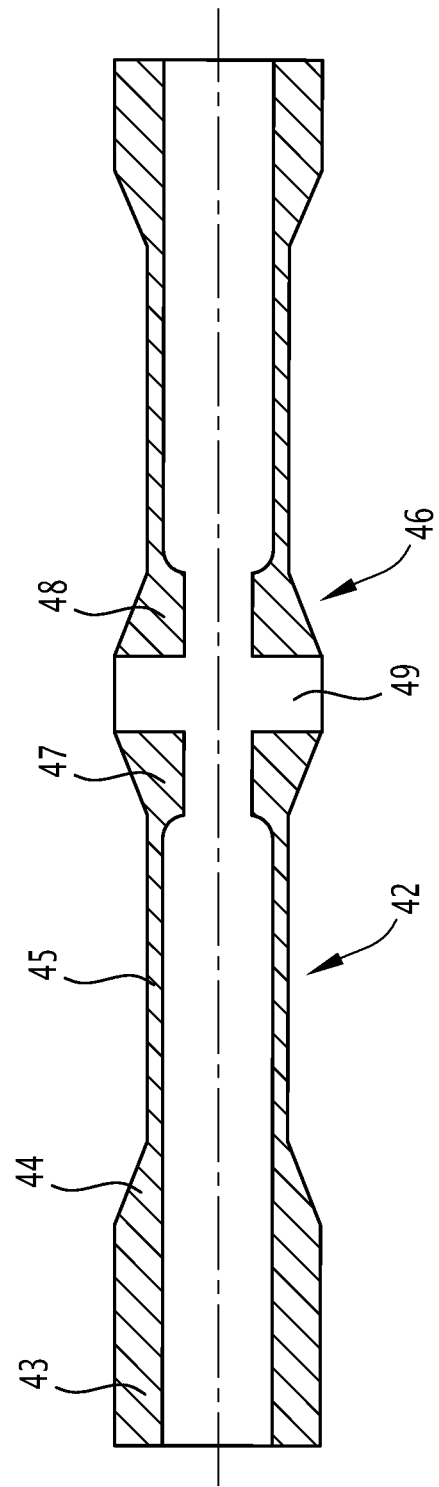
FIG. 32, which shows said co-forged assembly after the machining, which has given the beam its final condition.

The blank 38 and the sacrificial mandrels 34, 35 that it contains are then forged at 750° C., in order to obtain the part 42 shown in FIG. 31. At each end of said part 42 are successively found:

- A cylindrical portion 43 with outer diameter A1=393 mm, containing one of the sacrificial mandrels 34, 35 whose diameter has been reduced by the forging to 164 mm, which has retained the ratio K=2.39;
- A frustoconical portion 44 where both the outer diameter of the part 42 and the diameter of the mandrels 34, 35 decreases gradually, while retaining the ratio K=2.39;
- A cylindrical portion 45 with outer diameter A2=347 mm and where the diameter B2 of the sacrificial mandrel 34, 35 that it contains is 145 mm, the ratio K=2.39 having been retained;
- A solid portion 46 not containing a sacrificial mandrel portion and comprising two frustoconical portions 47, 48 connected by a cylindrical portion 49 with a diameter of 403 mm, and the function of which will be seen later.

In a variant, this part 42 can be obtained by a method comprising performing flattening, then edge stamping and machining, like in the preceding variant.

Lastly, the production of the beam 42 ends with machining that makes it possible to give the beam its final outer dimensions, remove the sacrificial mandrels 34, 35 in the form of chippings and develop an inner diameter of the beam 42 of 230 mm in the portions where the sacrificial mandrels 34, 35 were present, and an inner diameter of 155 mm in the portion where they were absent corresponding to the solid portion 46. Furthermore, this portion 46 undergoes drilling in its cylindrical portion 49, along an axis perpendicular to the longitudinal axis of the beam 42, to allow the beam to be connected to the shock absorber of the landing gear.

Of course, the examples that have been described and illustrated are not limiting, both in terms of the general shapes of the final parts that have been described and their dimensions.

The use of the container 5, in which the drilled blank 4, 21, 38 will be inserted, is merely one favored exemplary embodiment. It is possible to consider performing the various operations for drilling and insertion of the sacrificial mandrel(s) 2, 19, 34, 35 without the assistance of this container 5 and the associated centering ring 7.

Likewise, the heating of the drilled blank 4, 21, 38 before it is inserted into the container 5 (or more generally its drilling by the punch 10) is absolutely not mandatory.

Models and/or routine tests will be able to show one skilled in the art whether these operations are essential in order to obtain a satisfactory result.

Another variant of the present disclosure can consist of using, as punch 10, the sacrificial mandrel 2, 19, 34, 35 itself, by choosing to that end, in order to form the sacrificial mandrel 2, 19, 34, 35, a material with the appropriate mechanical properties in that they are compatible with both functions.

Likewise, the present disclosure is not limited to the case where one starts with blanks and sacrificial mandrels having a circular section, constant or variable along the length of the part, or to the case where the final part is entirely a part with a symmetry of revolution. One skilled in the art will easily be able to adapt the present disclosure to the case where certain portions of the final product do not have a circular section, for example after die stamping or machining. A container 5 and/or a punch 10 with non-cylindrical section(s) could contribute to bringing the blank or its internal space closer to the desired final shape by minimizing the subsequent deformation and machining that may be necessary.

It also goes without saying that the blanks and the sacrificial mandrels, as well as the final part that has been produced using the described method, can also undergo other operations in addition to those that have been described, for example heat treatments or shaping with or without removal of material, that would be compatible with the different steps of the inventive method. The important point is for the method for producing the final part to comprise at least the steps that have been described as being essential to implement the method according to the present disclosure.

What is claimed is:

1. A method for producing a hollow part made of a metal material having given yield stresses at given temperatures, the method comprising:
    preparing a blank having two ends, made up of the metal material of the hollow part, and a sacrificial mandrel made of a material that, at all temperatures at which the various simultaneous deformations of the blank and the sacrificial mandrel, will take place, has a yield stress in the range at the temperatures between the yield stress of the material of the blank minus 30% and the yield stress of the material of the blank plus 20% at the temperatures;
    applying a punch on one of the ends of the blank in order to produce an expansion of at least a portion of the blank and to create an internal space inside the blank without any material removal, the expansion of at least the portion of the blank including radially expanding an outer surface of the blank;
    inserting the sacrificial mandrel in the internal space of the blank; then
    crimping the sacrificial mandrel in the blank;
    producing, by co-forging, a simultaneous deformation of the blank and the sacrificial mandrel, with a homothetic ratio (K); and
    performing a machining in order to remove the sacrificial mandrel and impart a final configuration to the internal space of the part.

2. The method according to claim 1, wherein the simultaneous deformations of the blank and the sacrificial mandrel are done, with a deviation relative to the strict homothety from −15% to +10%,
    the deviation relative to the strict homothety being from −7% to +5% if the yield stress of the material of the sacrifical mandrel is between the yield stress of the material of the blank minus 15% and the yield stress of the material of the blank plus 10%,
    the deviation relative to the strict homothety being from −2.5% to +1.5% if the yield stress of the material of the sacrifical mandrel is between the yield stress of the material of the blank minus 5% and the yield stress of the material of the blank plus 3%.

3. The method according to claim 1, wherein at least one other simultaneous deformation of the blank and the sacrificial mandrel is produced before the machining.

4. The method according to claim 3, wherein the at least one other simultaneous deformation comprises a die stamping.

5. The method according to claim 3, wherein the at least one other simultaneous deformation comprises a drawing.

6. The method according to claim 1, wherein the blank has a symmetry of revolution.

7. The method according to claim 6, wherein the blank is cylindrical.

8. The method according to claim 1, wherein the sacrificial mandrel is cylindrical.

9. The method according to claim 1, wherein the blank is heated before the application of the punch.

10. The method according to claim 1, wherein before applying of the punch, the blank is inserted in the container of a press, a space being arranged between the blank and the inner wall of the container to allow the expansion of the blank.

11. The method according to claim 1, wherein the punch and the sacrificial mandrel are made up of the same part.

12. The method according to claim 1, wherein the blank is a Ti alloy of type Ti-10-2-3, the sacrificial mandrels are each made from a steel chosen from steels of types E28-3 and E24-2.

13. The method according to claim 1, wherein the blank is not expanded over its entire length and the sacrificial mandrel does not extend over the entire length of the blank, and the blank is turned over, the punch is applied on the other end of the blank, and the expansion of another portion of the blank is done by creating another internal space of the blank, and another sacrificial mandrel is inserted into the other internal space of the blank.

14. The method according to claim 1, wherein the sacrificial mandrel made of a material that, at all temperatures at which the various simultaneous deformations of the blank and the sacrificial mandrel, will take place, has a yield stress in the range from −15% to +10% of the yield stress of the material of the blank at the temperatures.

15. The method according to claim 14, wherein the sacrificial mandrel made of a material that, at all temperatures at which the various simultaneous deformations of the blank and the sacrificial mandrel, will take place, has a yield stress in the range from −5% to +3% of the yield stress of the material of the blank at the temperatures.

16. A method of producing a landing gear rod comprising:
performing the method of claim 1 to produce a landing gear rod.

17. A method of producing a landing gear beam comprising:
performing the method of claim 1 to produce a landing gear beam.

18. The method according to claim 1, wherein prior to the applying of the punch, the blank includes a hole formed therein, the applying of the punch to create the internal space expanding the hole.

19. The method according to claim 1, wherein the crimping of the sacrificial mandrel in the blank bridges a play between the sacrificial mandrel and the blank.

* * * * *